US010853763B1

(12) United States Patent
Armstrong et al.

(10) Patent No.: US 10,853,763 B1
(45) Date of Patent: Dec. 1, 2020

(54) ONBOARDING NEW SERVICE PROVIDERS UTILIZING PORTABLE SERVICE PROVIDER ATTRIBUTES

(71) Applicant: Square, Inc., San Francisco, CA (US)

(72) Inventors: Aaron Armstrong, San Leandro, CA (US); Rajat Mittal, San Francisco, CA (US); Neha Karajgikar, San Francisco, CA (US); Prashant Prabhu, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 76 days.

(21) Appl. No.: 15/472,681

(22) Filed: Mar. 29, 2017

(51) Int. Cl.
*G06Q 10/08* (2012.01)

(52) U.S. Cl.
CPC .................... *G06Q 10/087* (2013.01)

(58) Field of Classification Search
CPC ............... G06Q 20/208; G06Q 10/087; G06F 2209/5015
See application file for complete search history.

(56) References Cited

U.S. PATENT DOCUMENTS

| 9,064,285 | B1 * | 6/2015 | Nathoo | G06Q 10/1053 |
| 9,111,307 | B1 * | 8/2015 | Hanni | G06Q 30/0613 |
| 9,779,432 | B1 | 10/2017 | Shearer | |
| 9,892,458 | B1 | 2/2018 | Shearer et al. | |
| 2003/0200148 | A1 * | 10/2003 | Razumov | G06Q 30/06 705/7.36 |
| 2005/0097005 | A1 | 5/2005 | Fargo | |
| 2006/0095333 | A1 * | 5/2006 | Gambhir | G06Q 10/087 705/25 |
| 2008/0004926 | A1 | 1/2008 | Horvitz | |
| 2008/0005055 | A1 | 1/2008 | Horvitz | |
| 2010/0191569 | A1 | 7/2010 | Ellis et al. | |
| 2010/0205062 | A1 | 8/2010 | Glatt et al. | |
| 2011/0093326 | A1 | 4/2011 | Bous | |
| 2012/0066033 | A1 | 3/2012 | Frohwein et al. | |
| 2012/0131591 | A1 | 5/2012 | Moorthi et al. | |

(Continued)

OTHER PUBLICATIONS

Non-Final Office Action dated Jun. 24, 2019, for U.S. Appl. No. 15/608,566, of Ave, W., et al., filed May 30, 2017.

(Continued)

*Primary Examiner* — Florian M Zeender
*Assistant Examiner* — Vanessa Deligi
(74) *Attorney, Agent, or Firm* — Lee & Hayes, P.C.

(57) ABSTRACT

Techniques for onboarding new service providers based on portable service provider attributes are described. In an example, a server computing device may determine service provider attribute(s) of a service provider associated with a first merchant and associate the service provider attribute(s) with a data entry corresponding to an identifier of the service provider in a database. The server computing device may subsequently receive, from a point-of-sale device operated by a second merchant, identification data associated with the service provider and may determine the identifier of the service provider based on the identification data. Based on the identifier, the server computing device may access the service provider attribute(s) associated with the service provider from the database and may update a second merchant service inventory associated with the second merchant based on the service provider attribute(s) of the service provider.

20 Claims, 7 Drawing Sheets

(56) References Cited

U.S. PATENT DOCUMENTS

| | | |
|---|---|---|
| 2012/0265587 A1 | 10/2012 | Kinkead |
| 2013/0144675 A1 | 6/2013 | Ellis |
| 2014/0095232 A1 | 4/2014 | Shiva |
| 2014/0108124 A1 | 4/2014 | Bous et al. |
| 2014/0136259 A1* | 5/2014 | Kinsey, II .......... G06Q 30/0631 705/7.16 |
| 2014/0136266 A1* | 5/2014 | Kinsey, II .......... G06Q 10/1095 705/7.19 |
| 2014/0278684 A1* | 9/2014 | Masciarelli ........ G06Q 10/1095 705/7.19 |
| 2015/0066762 A1 | 3/2015 | Chatterton et al. |
| 2015/0100433 A1* | 4/2015 | Choy ................. G06Q 30/0269 705/14.69 |
| 2015/0363757 A1 | 12/2015 | Mocko et al. |
| 2015/0379553 A1 | 12/2015 | Copeland |
| 2016/0019636 A1* | 1/2016 | Adapalli ................. H04L 47/70 705/26.62 |
| 2016/0042382 A1 | 2/2016 | Isaacson |
| 2016/0055538 A1 | 2/2016 | Todasco |
| 2016/0071066 A1 | 3/2016 | Shiva |
| 2016/0078510 A1* | 3/2016 | Gadre ................. G06Q 10/1053 705/26.4 |
| 2016/0086222 A1 | 3/2016 | Kurapati |
| 2016/0098653 A1* | 4/2016 | Hojby ................. G06Q 10/0635 705/7.28 |
| 2016/0162936 A1 | 6/2016 | Khalil |
| 2016/0300192 A1 | 10/2016 | Zamer |
| 2016/0350721 A1 | 12/2016 | Comerford et al. |
| 2017/0154180 A1 | 6/2017 | Chatterton et al. |
| 2018/0114195 A1 | 4/2018 | Knight et al. |
| 2018/0114263 A1 | 4/2018 | Knight et al. |
| 2018/0150818 A1 | 5/2018 | Mocko et al. |
| 2018/0150825 A1 | 5/2018 | Myrick et al. |
| 2018/0197166 A1 | 7/2018 | Holman et al. |
| 2018/0204188 A1 | 7/2018 | Ellis et al. |
| 2018/0365739 A1 | 12/2018 | Koshy et al. |
| 2019/0073644 A1 | 3/2019 | Isaacson |

OTHER PUBLICATIONS

Final Office Action dated Nov. 29, 2019, for U.S. Appl. No. 15/608,566, of Ave, W., et al., filed May 30, 2017.

Non-Final Office Action dated Jan. 27, 2020, for U.S. Appl. No. 15/608,515, of Ave, W., et al., filed May 30, 2017.

Advisory Action dated Jan. 30, 2020, for U.S. Appl. No. 15/608,566, of Ave, W., et al., filed May 30, 2017.

Non-Final Office Action dated Feb. 13, 2020, for U.S. Appl. No. 15/799,523, of Cunliffe, L., et al., filed Oct. 31, 2017.

Non-Final Office Action dated Apr. 2, 2020, for U.S. Appl. No. 15/608,566, of Ave, W., et al., filed May 30, 2017.

Final Office Action dated Jul. 23, 2020, for U.S. Appl. No. 15/608,515, of Ave, W., et al., filed May 30, 2017.

* cited by examiner

700

```
┌─────────────────────────────────────────────────────────────┐
│ RECEIVE, FROM A DEVICE ASSOCIATED WITH A MERCHANT, A REQUEST│
│ FOR INFORMATION ASSOCIATED WITH ONE OR MORE SERVICE         │
│ PROVIDERS HAVING A PARTICULAR SERVICE PROVIDER ATTRIBUTE    │
│                            702                              │
└─────────────────────────────────────────────────────────────┘
                              │
                              ▼
┌─────────────────────────────────────────────────────────────┐
│ ACCESS SERVICE PROVIDER PROFILES STORING DATA ASSOCIATED    │
│ WITH A PLURALITY OF SERVICE PROVIDERS AND ONE OR MORE       │
│ SERVICE PROVIDER ATTRIBUTES                                 │
│                            704                              │
└─────────────────────────────────────────────────────────────┘
                              │
                              ▼
┌─────────────────────────────────────────────────────────────┐
│ DETERMINE ONE OR MORE SERVICE PROVIDERS ASSOCIATED WITH THE │
│ PARTICULAR SERVICE PROVIDER ATTRIBUTE                       │
│                            706                              │
└─────────────────────────────────────────────────────────────┘
                              │
                              ▼
┌─────────────────────────────────────────────────────────────┐
│ SEND, TO THE DEVICE, AN INDICATION IDENTIFYING THE ONE OR   │
│ MORE SERVICE PROVIDERS                                      │
│                            708                              │
└─────────────────────────────────────────────────────────────┘
```

FIG. 7

ONBOARDING NEW SERVICE PROVIDERS UTILIZING PORTABLE SERVICE PROVIDER ATTRIBUTES

BACKGROUND

Merchants offer items (i.e., goods, services, etc.) for acquisition (i.e., sale, rent, lease, etc.) by customers. To understand what items a merchant has available for acquisition, the merchant may maintain an inventory of the items. In some examples, the merchant may accomplish this via a computerized system that tracks inventory and provides point-of-sale functionality. The inventory may indicate a quantity of a particular good the merchant has available. Additionally and/or alternatively, the inventory may indicate a type of a particular service offered by the merchant. In some examples, the inventory may be dependent on service providers that are employed by, or otherwise acting on behalf of, the merchant. Current techniques for onboarding service providers require a merchant to manually enter information about individual service providers. Such techniques are time consuming and may be error laden.

BRIEF DESCRIPTION OF THE DRAWINGS

The above and other features of the present disclosure, its nature and various advantages, will be more apparent upon consideration of the following detailed description, taken in conjunction with the accompanying drawings in which:

FIG. 7 depicts a non-limiting flow diagram illustrating a method for searching for service provider(s) having particular service provider attribute(s) in accordance with some examples of the present disclosure.

Figure 1:
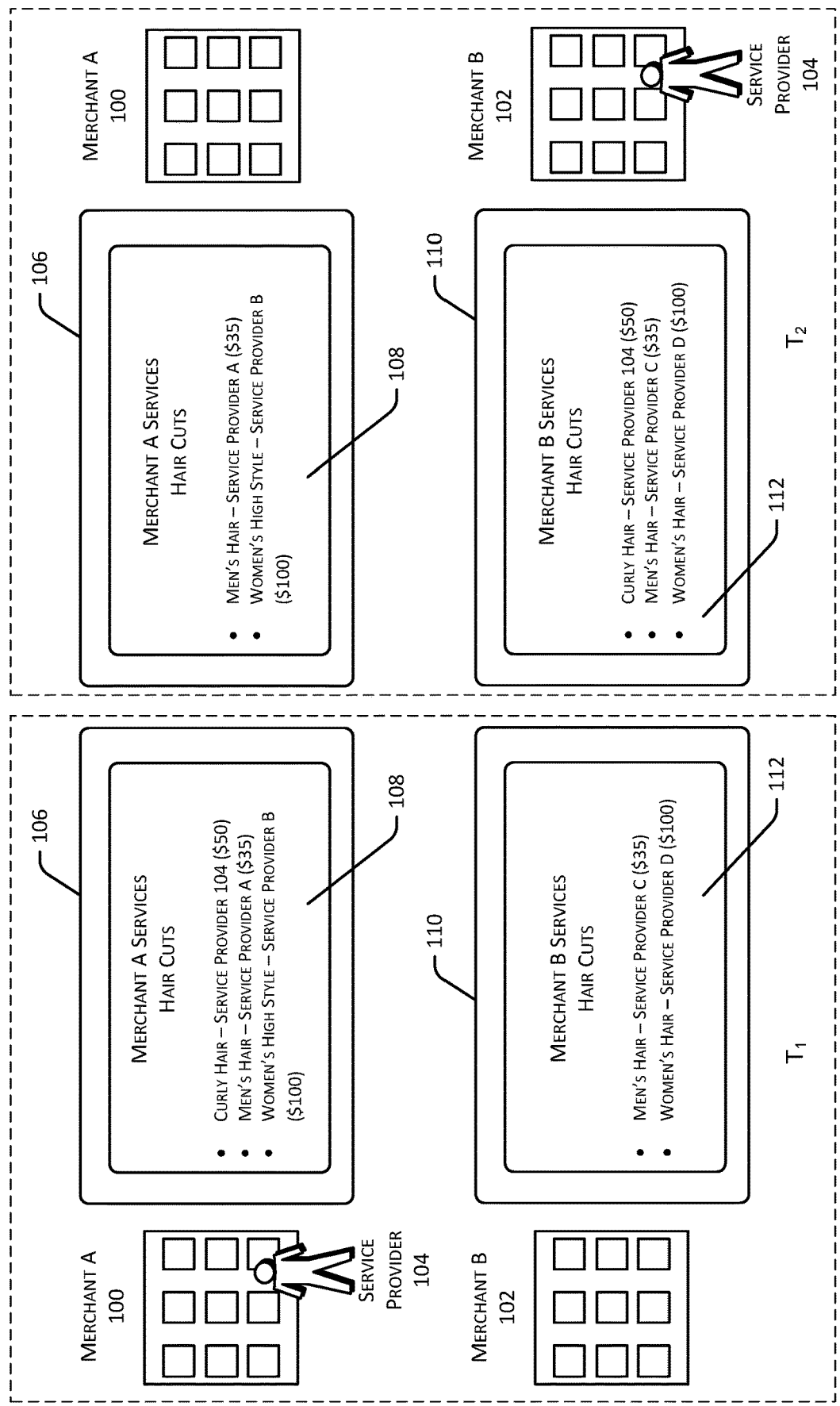
FIG. 1 depicts an illustrative block diagram illustrating onboarding new service providers based on portable service provider attributes in accordance with some examples of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A payment processing service may offer a variety of services to help merchants streamline their businesses. In at least one example, a payment processing service may offer point-of-sale (POS) systems which are associated with various applications associated with the payment processing service that ease POS interactions with customers. A POS system may include a POS terminal and a payment reader device. The payment reader device may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments. The POS terminal may provide a rich user interface, communicate with the payment reader device, and also communicate with a server associated with the payment processing service. In this manner, the POS terminal and payment reader device may collectively process transaction(s) between a merchant and customer(s).

In some examples, the payment processing service may additionally and/or alternatively provide tools to enable merchants to manage other aspects of their businesses. As examples, the payment processing service may provide tools for managing an inventory (i.e., inventory services) and/or onboarding new service-based employees (e.g., employee onboarding services). A tool for managing an inventory may enable a merchant to access and manage a database storing data associated with items that the merchant has available for acquisition. For the purpose of this discussion, an inventory may be representative of good and/or services offered by a particular merchant. In at least one example, as described below, the inventory may include a plurality of data items and a data item of the plurality of data items may represent an item that the merchant has available for acquisition. The data item may identify the item and may be associated with additional data that represents information about the item. For instance, the additional data may include attribute(s) of the item, a price of the item, a discount available for the item, taxes applicable to the item, a location of the item (e.g., where a good is located in a warehouse, where a service is performed), image(s) of the item, etc. In at least one example, attribute(s) may correspond to variants of the item and may be represented by attribute values. For instance, for a service, such as a haircut, an attribute may be a level of expertise (e.g., novice or expert), a type of service (e.g., curly hair haircut, men's haircut, high-fashion haircut, etc.), a certification associated with a service (e.g., AVEDA® trained, etc.), etc. Or, for a good, such as a t-shirt, an attribute may be a size, a color, a fit, etc.

In at least one example, the tool for managing inventory may provide inventory tracking and reporting. In some examples, the tool for managing inventory may enable a merchant to access the inventory to determine a quantity of each item that the merchant has available. The merchant may update the inventory following an inventory activity (i.e., where the merchant and/or entities associated with the merchant manually determine quantities of each of the items that the merchant has available), upon receiving new item(s) that are to be offered for acquisition, after item(s) are acquired by customers, etc. As described herein, the inventory of a merchant may be updated based at least in part on onboarding a new service provider. In additional and/or alternative examples, the payment processing service may update the inventory based on information received from the merchant and/or other sources and/or systems.

The payment processing service may provide various access points to a merchant so that the merchant can access and manage its inventory. As a non-limiting example, the payment processing service may enable a merchant to access and manage its inventory via a web interface, a user interface presented via a POS system operated by the merchant, etc. In at least one example, the inventory may be useful for generating inventory reports regarding items in the inventory of a merchant. Additionally and/or alternatively, the inventory may be useful for generating information that may be presented via user interfaces to advertise and/or otherwise communicate goods and/or services offered by a merchant.

A tool for onboarding new service-based employees may enable a merchant to access data associated with new service providers (e.g., employees, independent contractors, and/or other individuals acting on behalf of a merchant) which may be added to a profile and/or an inventory associated with the merchant. For the purpose of this discussion, a new service provider may be a service provider that is not associated with a particular merchant. Information associated with new service providers may be useful for payroll purposes and/or for determining what services and/or attributes of services service providers are capable of providing on behalf of the merchant. In some examples, a merchant may manually input data about a new service provider, for example via a user interface providing functionality for the merchant to input data. As a non-limiting example, a merchant may input data about a new service provider into a free-form text box and/or may utilize drop-down menus or other mechanisms to input data about a new service provider.

In other examples, data associated with a new service provider may be added to an inventory of the merchant with little or no input from the merchant. For instance, techniques described herein facilitate the transmission of data associated with a service provider from an inventory associated with a first merchant to an inventory associated with a second merchant based on determining an association between the service provider and the second merchant. In some examples, techniques described herein may prompt the second merchant to provide input prior to adding data associated with the service provider to an inventory associated with the second merchant. In such examples, the second merchant may provide some input, but is relieved from the laborious task of manually inputting individual data items via a user interface, as described above. In other examples, techniques described herein may transmit data associated with a service provider to an inventory associated with the second merchant without any input from the second merchant.

Techniques described herein are directed to onboarding new service providers based on portable service provider attributes. That is, in at least one example, one or more service provider attributes associated with a service provider may be mapped to, or otherwise associated with, an identifier that is unique to the service provider. Service provider attributes may include certification(s) of a service provider, level(s) of expertise of a service provider (e.g., expert, novice, etc.), specialty services offered by a service provider (e.g., a particular type of massage, a particular type of haircut, etc.), feedback associated with a service provider, a rating associated with a service provider, etc. In at least one example, an identifier associated with a service provider may be mapped to, or otherwise associated with, a first merchant. As a result, an inventory of the first merchant may be associated with services and/or attributes based on the service provider attributes associated with the service provider.

In at least one example, the service provider may additionally and/or alternatively be associated with a second merchant. For instance, the service provider may terminate its employment with the first merchant and may start as an employee of the second merchant. Or, the service provider may provide services for both the first merchant and the second merchant (e.g., a personal trainer working at multiple fitness facilities, a hair stylist working at multiple salons, etc.). In such examples, data associated with service provider attributes of the service provider may be transmitted to an inventory of the second merchant with little or no input from the second merchant, as described above.

Techniques described herein improve the functioning of POS devices by minimizing the amount of information input by a merchant upon onboarding new service providers, providing improved user efficiency and reducing errors associated with such data input. Furthermore, techniques described herein enable the secure and automated transmission of data associated with service provider attributes—and associated service(s) and/or attribute(s) associated with the service(s)—between merchant inventories. Additionally and/or alternatively, techniques described herein enable automatic modification and/or population of service-level information that is accessible and/or presented via a merchant POS device such that the service-level information includes identified and unique service(s) and/or attribute(s) associated with service(s) based on service provider(s) that are currently working and/or logged into the merchant POS device.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an illustrative block diagram illustrating onboarding new service providers based on portable service provider attributes. FIG. 1 illustrates an environment with two merchants, a first merchant, Merchant A 100, and a second merchant, Merchant B 102. At a first time ($T_1$), a service provider 104 is associated with Merchant A 100. That is, the service provider 104 may be employed by Merchant A 100, may be an independent contractor for Merchant A 100, etc. As a non-limiting example, the service provider 104 may specialize in cutting curly hair. That is, a service provider attribute associated with the service provider 104 may be a curly hair specialty. In one example, this service provider attribute may be determined based on service-level information derived from transaction data and interactive feedback provided by customers when compared to other service providers employed by Merchant A 100. Accordingly, such a service provider attribute may be associated with services and/or attributes of services offered by Merchant A 100.

As illustrated in FIG. 1, a merchant POS device 106 operated by Merchant A 100 may present a service menu via a user interface 108. The service menu may be based at least partly on the inventory of the respective merchant (e.g., Merchant A 100). The service menu may include a representation of the curly hair haircut available by Merchant A 100 as a result of service provider attributes associated with service provider 104. Merchant B 102 may operate a merchant POS device 110. A service menu associated with Merchant B 102 may be presented via a user interface 112. As illustrated, Merchant B 102 may offer a men's hair haircut and a women's hair haircut.

In at least one example, item(s) and/or attributes associated with the item(s) offered by merchants may be updated based on the acquisition or loss of service provider attributes associated with individual service providers. As an example, at a second time ($T_2$), the service provider 104 is associated with Merchant B 102 instead of Merchant A 100 (e.g., the service provider 104 may have quit working for Merchant A 100 and may have been hired by Merchant B 102). As a result, the service menu of Merchant A 100 that is presented via user interface 108 no longer includes a curly hair haircut, and the service menu of Merchant B 102 that is presented via user interface 112 includes a curly hair haircut. That is, the service provider attribute (e.g., curly hair specialty) associated with the service provider 104 is transmitted from an inventory of Merchant A 100 to an inventory of Merchant B 102. As a result, user interface 112 is updated to include a representation corresponding to an attribute based on the service provider attribute of the service provider 104. That is, user interface 112 includes a representation of a curly hair haircut offered by service provider 104 at the second time ($T_2$).

In some examples, in addition to item(s) and/or attributes associated with the item(s) offered by merchants being updated based on the acquisition or loss of service provider attributes associated with individual service providers, merchant attributes associated with the merchants may be updated based on the acquisition or loss of service provider attributes associated with individual service providers. For instance, in at least one example, losing a service provider that is deemed an expert in providing curly hair haircuts may be considered a detriment to Merchant A 100, and accordingly, a rating or other merchant attribute associated with Merchant A 100 may be decreased or negatively affected. Additionally, gaining a service provider that provides expertise in curly hair haircuts may be considered a benefit to Merchant B 102, and accordingly, a rating or other merchant attribute associated with Merchant B 102 may be increased or positively affected. For the purpose of this discussion, a rating may correspond to a score, a grade, a classification (e.g., four stars, five stars, etc.), etc.

The user interfaces shown in FIG. 1 (e.g., 108 and 112) are non-limiting examples of user interfaces that may be displayed for presenting services offered by merchants. Additional and/or alternative presentations and/or configurations may be imagined.

Figure 2:
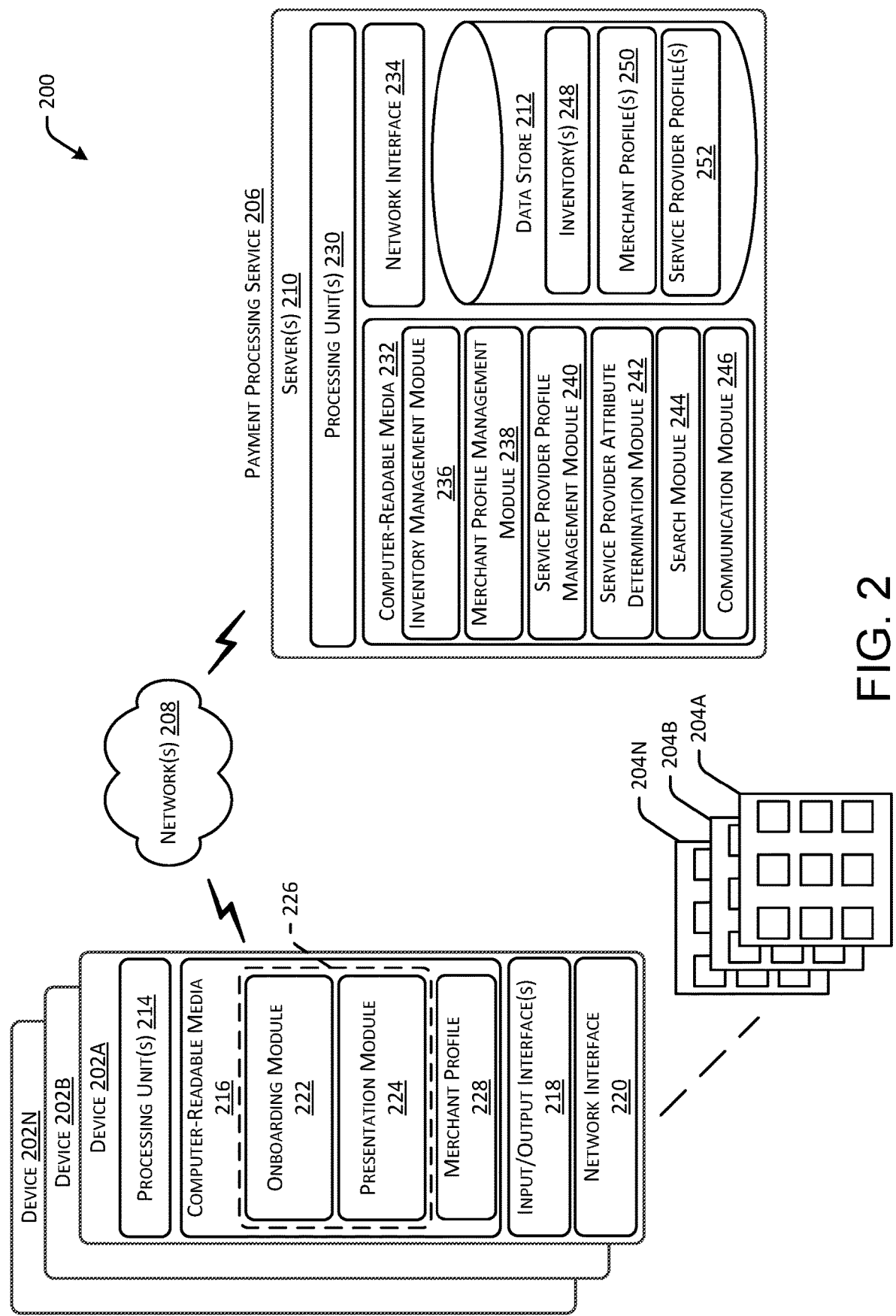
FIG. 2 depicts an illustrative block diagram of an employee service-provider onboarding system in accordance with some examples of the present disclosure.

FIG. 2 depicts an illustrative block diagram of an employee service-provider onboarding system 200. The employee service-provider onboarding system 200 may include device(s) 202A-202N (collectively, devices 202) respectively operated by merchant(s) 204A-204N (collectively, merchants 204), which are communicatively coupled to a payment processing service 206 via network(s) 208. A first device (e.g., device 202A) of the devices 202 may correspond to merchant POS device 106 and a second device (e.g., device 202B) of the devices 202 may correspond to merchant POS device 110, as described above with reference to FIG. 1. Details of device 202A are described herein; however, each of the devices 202 may be configured in a substantially same configuration.

Device 202A may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. In at least one example, device 202A may be a POS terminal, which may be connected to a payment reader device. That is, in at least one example, device 202A may be a POS system. In such an example, the payment reader device may be capable of accepting a variety of payment instruments, such as credit cards, debit cards, gift cards, short-range communication based payment instruments, and the like. In one example, payment reader device may be a wireless communication device that communicates wirelessly with an interactive electronic device such as a device 202, for example, using Bluetooth®, BLE, NFC, RFID, etc. In another example, payment reader device may be coupled to an interactive electronic device such as a device 202, for example, by being insertable into a connector mechanism (e.g., phone jack, headphone jack, etc.) of a smart phone or tablet. That is, in other examples, the payment reader device may be coupled to the device 202A via a wired connection. The payment reader device may interact with a payment instrument via a tap, dip, or swipe to obtain payment data associated with a customer.

Merchant 204A may operate device 202A. As described above, a merchant, e.g., merchant 204A, may be any individual, company, service provider, etc. that offers items for acquisition by customer(s). An item may be a good or a service. A customer may acquire an item by purchasing the item, renting the item, leasing the item, etc. In at least one example, the merchant 204A may be associated with one or more agents, such as service providers, sales associates, etc., which may act on behalf of the merchant 204A. The merchant 204A (i.e., an agent of the merchant 204A) may interact with the device 202A to process transactions and/or manage other aspects of the merchant's business via tools available by the payment processing service 206 (e.g., inventory, service provider onboarding, etc.). The payment processing service 206 may include one or more servers 210, including a data store 212, described below.

Device 202A may include processing unit(s) 214, computer-readable media 216, input/output interface(s) 218, and a network interface 220. The processing unit(s) 214 of the device 202A may execute one or more modules and/or processes to cause the device 202A to perform a variety of functions, as set forth above and explained in further detail in the following disclosure. In some examples, the processing unit(s) 214 may include a central processing unit (CPU), a graphics processing unit (GPU), both CPU and GPU, or other processing units or components known in the art. Additionally, each of the processing unit(s) 214 may possess its own local memory, which also may store program modules, program data, and/or one or more operating systems. Depending on the exact configuration and type of the device 202, the computer-readable media 216 may include volatile memory (such as RAM), non-volatile memory (such as ROM, flash memory, miniature hard drive, memory card, or the like), or some combination thereof. In various examples, the device 202A may include input/output interface(s) 218. Examples of input/output interface(s) 218 may include a keyboard, a mouse, a pen, a voice input device, a touch input device, a display, etc. Furthermore, the device 202A may include a network interface 220 for interfacing with the network(s) 208, as described below.

In at least one example, the computer-readable media 216 may include one or more modules for onboarding new service providers. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 214) to configure the device 202A to execute instructions and to perform operations described herein. The module(s) may include an onboarding module 222 and a presentation module 224. In some examples, the onboarding module 222 and the presentation module 224 may be associated with a merchant point-of-sale application 226. In at least one example, the computer-readable media 216 may also include a merchant profile 228.

The onboarding module 222 may enable merchants 204 to onboard new service providers. For instance, in at least one example, a merchant (e.g., merchant 204A) may input identification data associated with a new service provider via a user interface of a corresponding device 202A. As an example, the merchant 204A may input a name of a service provider, an identifier associated with a service provider, etc. In additional and/or alternative examples, the merchant 204A may input additional data including, but not limited to, data associated with contact information of the service provider, tax information of the service provider, demographic information of the service provider, etc. As described above, in some examples, the merchant 204A may input data associated with a service provider via a free-form text box and/or may utilize drop-down menus or other mechanisms to input data about the service provider. In at least one example, the onboarding module 222 may send identification data to the server(s) 210.

In at least one example, the onboarding module 222 may enable a merchant (e.g., merchant 204A) to search for service provider(s) having particular service provider attribute(s). That is, in at least one example, the onboarding module 222 may generate a request for information associated with one or more service providers having particular service provider attribute(s). The onboarding module 222 may send the request to the server(s) 210 and the server(s) 210 may return a result identifying one or more service providers having the particular service provider attribute(s).

The presentation module 224 may present user interfaces via the device 202. As described above with respect to FIG. 1, one or more user interfaces may be presented via display(s) of device(s) 202, such as to communicate services and/or attributes of services. The presentation module 224 may access inventory data and may generate user interface (s) to present at least some inventory data. That is, the presentation module 224 may be configured to access inventory data, generate representations corresponding to individual data items of the inventory data, and determine a configuration for presenting the representations via a user interface.

Additionally and/or alternatively, the presentation module 224 may present a user interface configured to prompt a merchant (e.g., merchant 204A) to input data about a new service provider for onboarding the new service provider. As described above, in some examples, a user interface may include a free-form text box, drop-down menus, and/or other mechanisms to enable the merchant 204A to input data about service provider(s). Furthermore, the presentation module 224 may present a user interface for updating data associated with service provider(s). Additionally and/or alternatively, the presentation module 224 may present a user interface for enabling a merchant (e.g., merchant 204A) to manage service providers, access information associated with service providers, etc.

Furthermore, in at least one example, the presentation module 224 may be configured to present search results via a user interface. As described above, the onboarding module 222 may enable a merchant (e.g., merchant 204A) to search for service provider(s) having particular service provider attribute(s). The onboarding module 222 may send the request to the server(s) 210 and the server(s) 210 may return a result identifying one or more service providers having the particular service provider attribute(s). The presentation module 224 may generate a user interface for presenting the result received from the server(s) 210.

The presentation module 224 may be configured to present additional and/or alternative user interfaces. In some examples, the presentation module 224 may receive instructions from the payment processing service 206 and dynamically output and/or update user interface(s) based on the instructions. In other examples, the presentation module 224 may access, determine, and/or receive data and may generate user interface(s) based on the data.

The merchant profile 228 may store data associated with a merchant (e.g., merchant 204A) including, but not limited to, data including information about the merchant 204A (e.g., name of the merchant, geographic location of the merchant, types of goods or services offered by the merchant, operating hours of the merchant, a merchant identifier, a merchant category classification, etc.), information about events associated with the merchant 204A (e.g., past and upcoming events, dates of events, locations of events, etc.), accounting information associated with the merchant 204A (e.g., bank(s) that the merchant banks with, etc.), contractual information associated with the merchant 204A (e.g., terms of a contract between the merchant and the payment service provider), transactional information associated with the merchant 204A (e.g., transactions conducted by the merchant, goods and/or service associated with the transactions, total spends of each of the transactions, parties to the transactions, dates, times, and/or locations associated with the transactions, etc.), etc. In at least one example, the merchant profile 228 may store at least a portion of an inventory of the merchant 204A (i.e., locally). In such an example, the merchant profile 228 may receive updated inventory data from the server(s) 210. Furthermore, the merchant profile 228 may store data associated with one or more service providers (e.g., employees, independent contractors, and/or other individuals acting on behalf of the merchant 204A) associated with the merchant 204A. The data may include service provider attribute(s) associated with the one or more service providers, employment status(es) associated with the one or more service providers, etc. In some examples, at least a portion of the merchant profile 228 may be stored in the data store 212, as described below.

As described above, the payment processing service 206 may include one or more servers 210. The server(s) 210 may include processing unit(s) 230, computer-readable media 232, and a network interface 234. The processing unit(s) 230 of the server(s) 210 may execute one or more modules and/or processes to cause the server(s) 210 to perform a variety of functions, as set forth above and explained in further detail in the following disclosure. In some examples, the processing unit(s) 230 may include a CPU, a GPU, both CPU and GPU, or other processing units or components known in the art. Additionally, each of the processing unit(s) 230 may possess its own local memory, which also may store program modules, program data, and/or one or more operating systems. Depending on the exact configuration and type of the server(s) 210, the computer-readable media 232 may include volatile memory (such as RAM), non-volatile memory (such as ROM, flash memory, miniature hard drive, memory card, or the like), or some combination thereof. The server(s) 210 may include a network interface 234 for interfacing with the network(s) 208, as described below.

In at least one example, the computer-readable media 232 may include one or more modules for enabling inventory management and facilitating onboarding new service providers based on portable service provider attributes. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 230) to configure the server(s) 210 to execute instructions and to perform operations described herein. The module(s) may include an inventory management module 236, a merchant profile management module 238, a service provider profile management module 240, a service provider attribute determination module 242, a search module 244, and a communication module 246.

The inventory management module 236 may manage inventory(s) 248 stored in the data store 212. Each merchant may be associated with an inventory of the inventory(s) 248. An inventory of a merchant (e.g., merchant 204A) may identify the items that the merchant has available for acquisition at a particular time. An inventory may include a plurality of data items and a data item of the plurality of data items may represent an item that a merchant (e.g., merchant 204A) has available for acquisition. Each data item may identify a respective item and may be associated with additional data that represents information about the respective item. For instance, the additional data may include attribute(s) of the respective item, a price of the respective item, a discount available for the respective item, taxes applicable for the respective item, image(s) of the respective item, an identification code for the respective item (e.g., a stock keeping unit (SKU)), etc. In an example where an item is a service, the additional data may identify one or more service providers capable of providing the service and/or an attribute of the service. An inventory may enable a merchant (e.g., merchant 204A) to know what item(s) and the quantity of each item that the merchant 204A has available at a particular time. Table 1, below, is a non-liming example of a portion of a database associated with inventory(s) 248.

TABLE 1

| Inventory | Service | Attribute | Price | SKU | Service Provider |
| --- | --- | --- | --- | --- | --- |
| Merchant A | Hair cut | Expert | $100 | 1123456 | J |
| | | Novice | $50 | 1123478 | K |
| | Hair color | Blonde hair | $150 | 1234578 | L |
| | | Curly hair | $120 | 1456788 | M |
| Merchant B | Massage | Deep tissue | $125 | 5757583 | P |
| | | Swedish | $105 | 5757578 | R |
| | | Relaxation | $95 | 5757576 | T |

In at least one example, the inventory management module 236 may receive instructions associated with modifying inventory(s) and may update respective inventory(s) based on the instructions. For instance, device 202A may send instructions to the payment processing service 206 which may identify a modification that is to be made to an inventory associated with a merchant (e.g., merchant 204A). As a result, the inventory management module 236 may modify the inventory consistent with the instructions. As described above, in some examples, the instructions may be received from device(s) associated with merchant(s) (e.g., devices 202). In other examples, the instructions may be received from the merchant profile management module 238, as described below. In additional and/or alternative examples, the instructions may be received from third-party sources or systems.

In at least one example, the inventory management module 236 may receive an indication that a service provider associated with a first merchant (e.g., merchant 204A) is additionally and/or alternatively associated with a second merchant (e.g., merchant 204B). Based at least in part on receiving such an indication, the inventory management module 236 may update an inventory of the second merchant (e.g., merchant 204B) with information associated with the service provider from an inventory of the first merchant (e.g., merchant 204A). Based at least in part on updating an inventory of the second merchant (e.g., merchant 204B), the communication module 246, described below, may send updated inventory data to the device (e.g., device 202B) operated by the second merchant (e.g., merchant 204B) to update inventory data associated with a local merchant profile. As a result, the device (e.g., device 202B) operated by the second merchant may modify the inventory displayed via the device (e.g., device 202B). Additional details associated with the inventory management module 236 transmitting information between inventories 248 associated with different merchants are described below with reference to FIGS. 3-6.

The merchant profile management module 238 may manage merchant profile(s) 250 stored in the data store 212. The data store 212 may include merchant profile(s) 250 respectively corresponding to individual merchants 204A-204N. As described above, a merchant profile of a merchant (e.g., merchant 204A) may store data associated with the merchant 204A including, but not limited to, data including information about the merchant 204A (e.g., name of the merchant, geographic location of the merchant, types of goods or services offered by the merchant, operating hours of the merchant, a merchant identifier, a merchant category classification, etc.), information about events associated with the merchant 204A (e.g., past and upcoming events, dates of events, locations of events, etc.), accounting information associated with the merchant 204A (e.g., bank(s) that the merchant banks with, etc.), contractual information associated with the merchant 204A (e.g., terms of a contract between the merchant and the payment service provider), transactional information associated with the merchant 204A (e.g., transactions conducted by the merchant, goods and/or service associated with the transactions, total spends of each of the transactions, parties to the transactions, dates, times, and/or locations associated with the transactions, etc.), etc. Furthermore, the merchant profile 228 may store data associated with one or more service providers (e.g., employees, independent contractors, and/or other individuals acting on behalf of the merchant 204A) associated with the merchant 204A. The data may include service provider attribute(s) associated with the one or more service providers, employment status(es) associated with the one or more service providers, etc. In at least one example, at least a portion of a merchant profile may reference an inventory corresponding to the merchant 204A and/or a profile corresponding to a service provider. In some examples, at least a portion of the merchant profile 228 may be stored on the device 202A associated with the merchant 204A. Table 2, below, is a non-limiting example of a portion of a database associated with merchant profile(s) 250.

TABLE 2

| Profile | Location | Merchant Category Code | Inventory | Service Providers | |
|---------|----------|------------------------|-----------|---|---|
| Merchant A | Oakland, CA | 034 (salon) | [Refer to Inventory] | J | [Refer to Service Provider Profile] |
| | | | | K | [Refer to Service Provider Profile] |
| | | | | L | [Refer to Service Provider Profile] |
| | | | | M | [Refer to Service Provider Profile] |
| Merchant B | San Jose, CA | 068 (spa) | [Refer to Inventory] | P | [Refer to Service Provider Profile] |
| | | | | S | [Refer to Service Provider Profile] |
| | | | | T | [Refer to Service Provider Profile] |

The merchant profile management module 238 may add data to and/or update data stored in the merchant profile(s) 250. In at least one example, the merchant profile management module 238 may receive data from device(s) 202 and may add data to and/or update data stored in the merchant profile(s) 250 based on the data received from the device(s) 202. For instance, the merchant profile management module 238 may associate an identifier of a service provider with a merchant profile based on determining that a service provider is newly associated with the corresponding merchant. Additionally and/or alternatively, the merchant profile management module 238 may terminate an association between an identifier of a service provider and a merchant profile based on determining that the service provider is no longer associated with the corresponding merchant.

In at least one example, the merchant profile management module 238 may determine that a service provider is associated with an additional and/or alternate merchant. In at least one example, the merchant profile management module 238 may receive an indication that a service provider is associated with a second merchant and the merchant profile management module 238 may determine that the service provider is associated with the second merchant based at least in part on the indication. In some examples, the merchant profile management module 238 may receive an indication from a device (e.g., device 202B) operated by the additional and/or alternate merchant. For instance, the device 202B may send an indication to the merchant profile management module 238 which indicates that the service provider is associated with the additional and/or alternate merchant.

In an alternative example, a device (e.g., device 202B) may provide transaction data to the merchant profile management module 238. The merchant profile management module 238 may perform one or more data processing techniques (e.g., semantic data mining, natural language processing, and/or other information extracting techniques) to process the transaction data. Based at least in part on performing one or more data processing techniques, the merchant profile management module 238 may determine that the service provider is providing services on behalf of the additional and/or alternate merchant. Accordingly, the merchant profile management module 238 may determine that the service provider is associated with the additional and/or alternate merchant.

In other examples, the merchant profile management module 238 may receive an indication that the service provider is associated with the additional and/or alternate merchant from a device associated with the service provider.

For instance, in some examples, a service provider may provide services on behalf of more than one merchant (e.g., a merchant and an additional and/or alternate merchant). As a non-limiting example, the service provider may be a hair stylist that works at multiple salons or a personal trainer who trains clients for multiple fitness centers. In such examples, the service provider may interact with his or her device to indicate which merchant (e.g., a merchant or an additional and/or alternate merchant) the service provider is working at on a particular day or at a particular time. The merchant profile management module 238 may receive such an indication and may determine that the service provider is associated with an additional and/or alternate merchant based at least in part on the indication.

The service provider profile management module 240 may manage service provider profile(s) 252 stored in the data store 212. In at least one example, the data store 212 may include service provider profile(s) 252 respectively corresponding to individual service providers. Each service provider profile may be associated with an identifier that is unique to the service provider to which the service provider profile corresponds. A service provider profile may include demographic data associated with a service provider, services offered by the service provider, service provider attributes associated with the service provider, an employment status associated with a service provider, etc. As described above, service provider attributes may identify certification(s) of a service provider, level(s) of expertise of a service provider (e.g., expert, novice, etc.), specialty services offered by a service provider (e.g., a particular type of massage, a particular type of haircut, etc.), feedback associated with a service provider, a rating associated with a service provider, etc. The employment status of a service provider may identify one or more merchants that employ the service provider and whether each of the one or more merchants employ the service provider in a fulltime capacity, part time capacity, temporary capacity, as an independent contractor, etc. Table 3, below, is a non-limiting example of a portion of a database associated with service provider profile(s) 252.

TABLE 3

| Service Provider | Employment Status | Service Type | Service Provider Attributes |
|---|---|---|---|
| J | Merchant A Full time | Barber | Men's Haircuts Crew Cut Specialty Expert 5-star rating |
| K | Merchant A Full time | Barber | Women's Haircuts Bangs Novice 5-star rating |
| L | Merchant A Full time | Hair Stylist | Blonde Color Specialty 4-star rating |
| M | Merchant A Full time | Hair Stylist | Curly Color Specialty 5-star rating |

The service provider profile management module 240 may add data to and/or update data stored in the service provider profile(s) 252. For instance, the service provider profile management module 240 may receive instructions from the service provider attribute determination module 242, described below, and may add data to and/or update data stored in service provider profile(s) 252 based on the instructions. Additionally, the service provider profile management module 240 may receive data from device(s) 202 and may add data to and/or update data stored in the service provider profile(s) 252. In at least one example, the service provider profile management module 240 may update data stored in the service provider profile(s) 252 based at least in part on determining that a service provider changes his or her employment status. That is, the service provider profile management module 240 may update a service provider profile to identify a new merchant by which the employee is employed.

The service provider attribute determination module 242 may process data to determine information associated with service providers. For instance, the service provider attribute determination module 242 may access transaction data associated with transactions between merchant(s) and customer(s). In at least one example, the service provider attribute determination module 242 may access transaction data associated with one or more transactions between a merchant (e.g., merchant 204A) and one or more customers that are associated with a same identifier representative of a service provider. That is, the service provider attribute determination module 242 may access transaction data associated with one or more transactions that involve a same service provider. The service provider attribute determination module 242 may perform one or more data processing techniques (e.g., semantic data mining, natural language processing, and/or other information extracting techniques) to determine service provider attribute(s) associated with the service provider. For instance, the service provider attribute determination module 242 may determine, based at least in part on transaction data associated with a same identifier, that a service provider corresponding to the identifier provides curly hair haircuts. Or, the service provider attribute determination module 242 may determine, from transaction data associated with a same identifier, that a service provider provides deep tissue massages. In some examples, the service provider attribute determination module 242 may process the transaction data to determine scope(s) of a service provider's services. For instance, the service provider attribute determination module 242 may process the transaction data to determine that a service provider provides haircuts 40% of the time and hair color services 60% of the time. Such information, which may correspond to service provider attributes, may be mapped to, or otherwise associated with, a respective service provider profile, as described above.

In some examples, the service provider attribute determination module 242 may process transaction data to generate feedback data. For instance, the service provider attribute determination module 242 may access tips (i.e., gratuities) associated with particular services. Tips having values above a threshold value may indicate positive feedback. Tips having values below a threshold value may indicate negative feedback. In some examples, a number of tips above a threshold having values that are above a threshold value (i.e., a high number of tips above a threshold value) may indicate that the service provider is well liked, performs satisfactory services, etc. Or, alternatively, a number of tips above a threshold having values that are below a threshold value (i.e., a high number of tips below a threshold value) may indicate that a service provider is not well liked, does not perform satisfactory services, etc. Such feedback data, which may correspond to service provider attribute(s), may be mapped to, or otherwise associated with, a respective service provider profile, as described above.

In some examples, the service provider attribute determination module 242 may process data associated with reviews or other feedback mechanisms to determine feedback data. For instance, the service provider attribute determination module 242 may access data associated with social media service providers (e.g., FACEBOOK®, TWITTER®, YELP®, etc.) and may perform one or more data processing techniques (e.g., semantic data mining, natural language processing, and/or other information extracting techniques) to determine feedback data (e.g., customer sentiment) associated with a service provider. As an example, a customer may leave a review on YELP® that articulates that a particular service provider "was the best colorist" or that a particular service provider "was rude and didn't follow directions." In such circumstances, the service provider attribute determination module 242 may process the reviews to determine that the particular service provider is well liked, or provides quality color services, or that the particular service provider is not well liked, or does not provide quality services, respectively. Such feedback data may correspond to a service provider attribute, which may be mapped to, or otherwise associated with, a respective service provider profile, as described above.

In some examples, the feedback data may be used to generate a rating associated with a service provider. As described above, a rating may correspond to a score, a grade, a classification (e.g., four stars, five stars, etc.), etc. In at least one example, a rating may correspond to a service provider attribute. Such service provider attributes may be mapped to, or otherwise associated with, a respective service provider profile, as described above.

In at least one example, the service provider attribute determination module 242 may access data associated with service providers that is presented via third-party sources or systems. For instance, in some examples, the service provider attribute determination module 242 may access publicly accessible data associated with a service provider via a LINKED-IN® profile, a FACEBOOK® profile, a website profile, etc. The service provider attribute determination module 242 may leverage such data to determine service provider attributes associated with a service provider. Such service provider attributes may be mapped to, or otherwise associated with, a respective service provider profile, as described above.

The search module 244 may perform searches on data stored in the data store 212. In at least one example, the search module 244 may receive a query from a device (e.g., device 202A). The query may be a request for the identity of one or more service providers having particular service provider attribute(s). The search module 244 may access data in the data store 212 to determine one or more service providers having the particular service provider attribute(s). The search module 244 may provide a result back to the device (e.g., device 202A) based on the results of its search. Additional details associated with conducting a search are described below with reference to FIG. 7.

The communication module 246 may send data to and receive data from the devices 202. For instance, the communication module 246 may receive data from a device (e.g., device 202A) indicating that a service provider is to be associated with the corresponding merchant 204A. As an example, the communication module 246 may receive identification data identifying a service provider and an instruction to associate the service provider with the merchant 204A corresponding to the device 202A sending the identification data and the instruction. Additionally and/or alternatively, the communication module 246 may receive data associated with service providers, such as data associated with individual service providers that has been input by a merchant (e.g., merchant 204A) via a user interface presented via a corresponding device (e.g., device 202A).

In at least one example, the communication module 246 may provide instructions to the devices 202 which may instruct the devices 202 to update respective merchant profiles stored on the devices 202. For instance, the communication module 246 may provide updated inventory data to a device (e.g., device 202A) based on the addition and/or removal of a service provider. Additionally and/or alternatively, the communication module 246 may provide instructions to a device (e.g., device 202A) instructing the device 202A to update the merchant profile 228 with information associated with a new service provider. Or, the communication module 246 may provide instructions to a device (e.g., device 202A) instructing the device 202A to update the merchant profile 228 by removing information associated with a previous service provider.

The server(s) 210 may further include a data store 212. The data store 212 may be configured to store data so that it may be accessible, manageable, and updatable. In at least one example, the data store 212 may include one or more inventories 248, one or more merchant profiles 250, and one or more service provider profiles 252. In some examples, the one or more inventories 248, the one or more merchant profiles 250, and the one or more service provider profiles 252 may be associated with individual databases. In other examples, the one or more inventories 248, the one or more merchant profiles 250, and the one or more service provider profiles 252 may be associated with a single database.

Network(s) 208 may be any type of network known in the art, such as a local area network or a wide area network, such as the Internet, and may include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 208 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail. Consequently, the devices 202 and/or the payment processing service 206 may communicatively couple to network(s) 208 in any manner, such as by a wired or wireless connection. Network(s) 208 may also facilitate communication between the devices 202 and the payment processing service 206. In turn, network interfaces (e.g., network interface 220 and network interface 234) may be any network interface hardware components that may allow the devices 202 and/or the server(s) 210 to communicate over the network(s) 208.

FIGS. 3-7 illustrate various processes for onboarding new service providers utilizing portable service provider attributes. The processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

Figure 3:
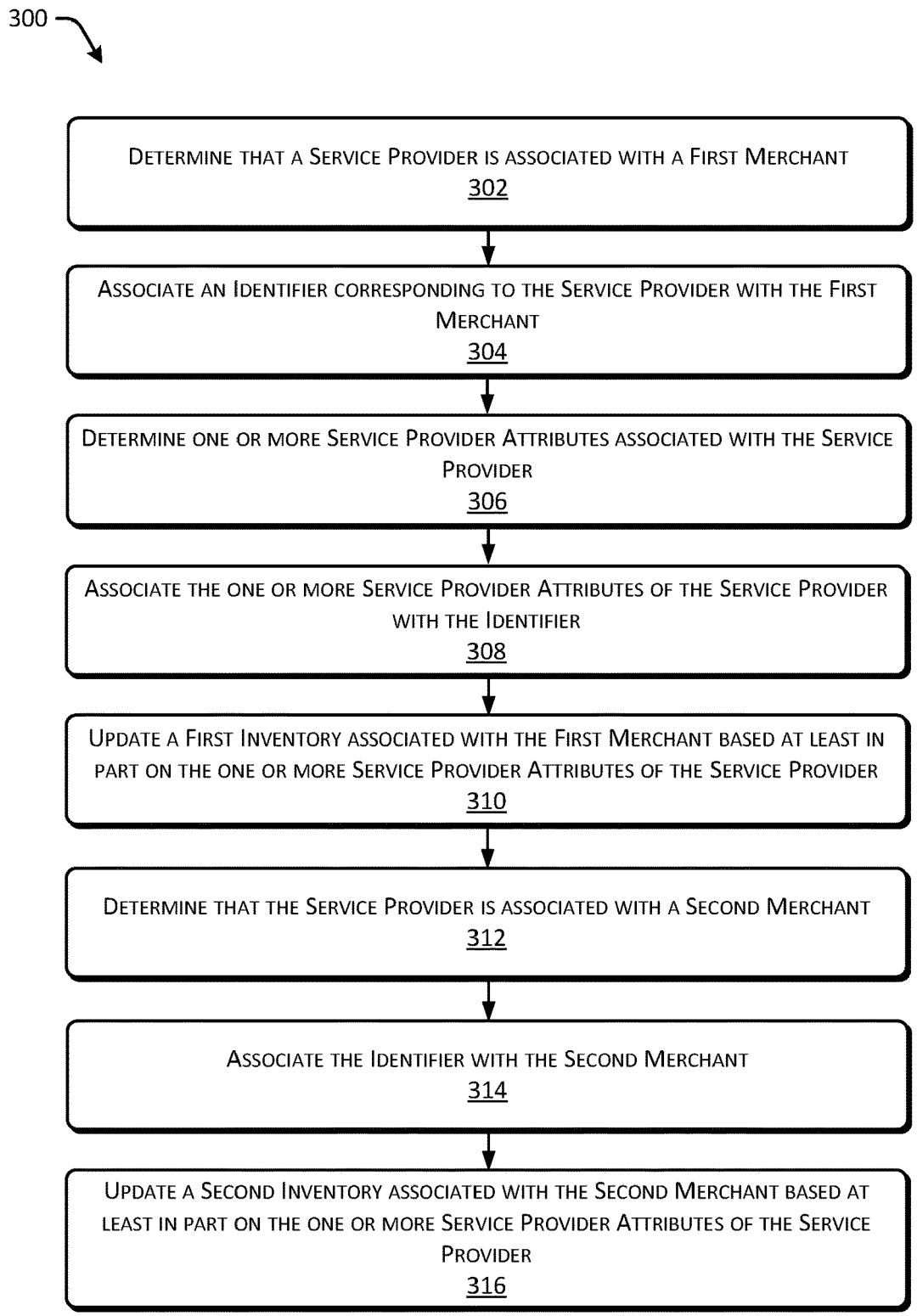
FIG. 3 depicts a non-limiting flow diagram illustrating a method for onboarding new service providers based on portable service provider attributes in accordance with some examples of the present disclosure.

FIG. 3 depicts a non-limiting flow diagram illustrating a method 300 for onboarding new service providers based on portable service provider attributes. FIG. 3 is illustrated in the employee service-provider onboarding system 200 described above with reference to FIG. 2; however, FIG. 3 should not be limited to such an employee service-provider onboarding system.

Block 302 illustrates determining that a service provider is associated with a first merchant. In at least one example, the merchant profile management module 238 may receive an indication that a service provider is associated with a first merchant. For instance, a device (e.g., device 202A) operated by a first merchant may send an indication to the merchant profile management module 238 which indicates that the service provider is associated with the first merchant. In at least one example, the indication may be associated with identification data associated with the service provider. Additionally, the indication may include data indicating an employment status of the service provider. For instance, as a non-limiting example, the data indicating the employment status of the service provider may indicate that the service provider is employed by the first merchant as a full-time employee.

In some examples, the service provider profile management module 240 may determine whether the service provider profile(s) 252 include a service provider profile corresponding to the service provider. Based at least in part on determining that the service provider profile(s) 252 do not include a service provider profile corresponding to the service provider, the service provider profile management module 240 may generate a service provider profile for the service provider. The service provider profile management module 240 may generate and/or assign an identifier that is unique to the service provider to the service provider profile. In at least one example, the identification data and/or data indicating an employment status of the service provider may be mapped to, or otherwise associated with, the service provider profile. In some examples, the service provider profile management module 240 may send, to the device 202A operated by the first merchant, a request for data associated with the service provider. For instance, the service provider profile management module 240 may request demographic data associated with the service provider, tax data associated with the service provider, etc. The service provider profile management module 240 may map, or otherwise associate, any additional data received with the service provider profile.

Block 304 illustrates associating an identifier with the first merchant. In at least one example, the merchant profile management module 238 may map, or otherwise associate, an identifier that is unique to the service provider with a merchant profile corresponding to the first merchant in the merchant profile(s) 250. Additionally and/or alternatively, the service provider profile management module 240 may map, or otherwise associate, an identifier associated with the first merchant with an identifier that is unique to the service provider. That is, in additional and/or alternative examples, the service provider profile management module 240 may map, or otherwise associate, an identifier associated with the first merchant with a service provider profile corresponding to the service provider in the service provider profile(s) 252.

Block 306 illustrates determining one or more service provider attributes associated with the service provider. As described above, the service provider attribute determination module 242 may process data to determine information associated with service providers. For instance, the service provider attribute determination module 242 may access transaction data associated with transactions between merchant(s) and customer(s) and may process the transaction data by performing one or more data processing techniques (e.g., semantic data mining, natural language processing, and/or other information extracting techniques) to determine service provider attribute(s) associated with the service provider. For instance, the service provider attribute determination module 242 may process transaction data to identify one or more specialty services offered by a service provider.

In some examples, the service provider attribute determination module 242 may process transaction data to generate feedback data. Additionally and/or alternatively, in some examples, the service provider attribute determination module 242 may process data associated with reviews or other feedback mechanisms to determine feedback data. The feedback data may correspond to a service provider attribute and/or may be used to generate a rating, which may correspond to a service provider attribute. Furthermore, in at least one example, the service provider attribute determination module 242 may access data associated with service providers that is presented via third-party sources or systems (e.g., LINKED-IN®, FACEBOOK®, etc.) and the service provider attribute determination module 242 may leverage such data to determine service provider attributes associated with a service provider.

Block 308 illustrates associating the one or more service provider attributes of the service provider with the identifier. In at least one example, the service provider profile management module 240 may receive, from the service provider attribute determination module 242, data associated with service provider attribute(s) associated with a service provider. The service provider profile management module 240 may map, or otherwise associate, the data associated with the service provider attribute(s) with an identifier associated with the service provider. That is, the service provider profile management module 240 may map, or otherwise associate, the data associated with the service provider attribute(s) to a service provider profile associated with the service provider in the service provider profile(s) 252.

Block 310 illustrates updating a first inventory associated with the first merchant based at least in part on the one or more service provider attributes of the service provider. As described above, individual merchants may be associated with individual inventories of the inventory(s) 248. An inventory of a merchant (e.g., merchant 204A) may identify the items that the merchant has available for acquisition at a particular time. An inventory may include a plurality of data items and a data item of the plurality of data items may represent an item that a merchant (e.g., merchant 204A) has available for acquisition. Each data item may identify a respective item and may be associated with additional data that represents information about the respective item. For instance, the additional data may include attribute(s) of the respective item, a price of the respective item, a discount available for the respective item, taxes applicable for the respective item, image(s) of the respective item, an identification code for the respective item (e.g., a stock keeping unit (SKU)), etc.

In at least one example, the merchant profile management module 238 may provide an indication to the inventory management module 236 that the service provider is associated with the first merchant. As a result, inventory management module 236 may update a first inventory associated with the first merchant based at least in part on the one or more service provider attributes. For instance, the inventory management module 236 may add a service and/or an attribute associated with a service based on the one or more service provider attributes to the first inventory. Additionally and/or alternatively the inventory management module 236 may map, or otherwise associate, an identifier of the service provider to existing service(s) and/or attribute(s) of service (s) in the first inventory based at least in part on the one or more service provider attributes.

Block 312 illustrates determining that the service provider is associated with a second merchant. In at least one example, the merchant profile management module 238 may receive an indication that a service provider is associated with a second merchant. In some examples, the service provider may be associated with the second merchant instead of the first merchant. In other examples, the service provider may be associated with the second merchant in addition to the first merchant.

In some examples, the merchant profile management module 238 may receive an indication from a device (e.g., device 202B) operated by the second merchant. For instance, the device 202B may send an indication to the merchant profile management module 238 which indicates that the service provider is associated with a second merchant. In at least one example, the indication may be associated with identification data associated with the service provider. Additionally, the indication may include data indicating an employment status of the service provider. For instance, the data indicating the employment status of the service provider may indicate that the service provider is employed by the second merchant as a full-time employee.

In an alternative example, device 202B may be coupled to a payment reader device and, as transactions are processed via the payment reader device, device 202B may provide transaction data to the merchant profile management module 238 of the server(s) 210. The merchant profile management module 238 may perform one or more data processing techniques (e.g., semantic data mining, natural language processing, and/or other information extracting techniques) to process the transaction data. Based at least in part on performing one or more data processing techniques, the merchant profile management module 238 may determine that the service provider is providing services on behalf of the second merchant. Accordingly, the merchant profile management module 238 may determine that the service provider is associated with the second merchant.

In other examples, the merchant profile management module 238 may receive an indication that the service provider is associated with the second merchant from a device associated with the service provider. For instance, in some examples, a service provider may provide services on behalf of more than one merchant (e.g., the first merchant and the second merchant). As a non-limiting example, the service provider may be a hair stylist that works at multiple salons or a personal trainer who trains clients for multiple fitness centers. In such examples, the service provider may interact with his or her device to indicate which merchant (e.g., the first merchant or the second merchant) the service provider is working at on a particular day or at a particular time. Accordingly, the merchant profile management module 238 may determine that the service provider is associated with the second merchant.

Additionally and/or alternatively, a service provider may log in via a device (e.g., device 202B) operated by the second merchant and such a log in may indicate that the service provider is associated with the second merchant. That is, the device (e.g., device 202B) may send an indication to the merchant profile management module 238 indicating that the service provider is logged in, and accordingly, the merchant profile management module 238 may determine that the service provider is associated with the second merchant.

In some examples, an indication that a service provider is associated with the second merchant may include an express indication that the service provider is no longer associated with the first merchant. In additional and/or alternative examples, the merchant profile management module 238 may determine whether the service provider is associated with the second merchant instead of the first merchant based at least in part on data received from the first merchant and/or the second merchant, as described below.

Block 314 illustrates associating the identifier with the second merchant. In at least one example, the merchant profile management module 238 may map, or otherwise associate, an identifier that is unique to the service provider with a merchant profile corresponding to the second merchant in the merchant profile(s) 250. Additionally and/or alternatively, the service provider profile management module 240 may map, or otherwise associate, an identifier associated with the second merchant with an identifier that is unique to the service provider. That is, in additional and/or alternative examples, the service provider profile management module 240 may map, or otherwise associate, an identifier associated with the second merchant with a service provider profile corresponding to the service provider in the service provider profile(s) 252.

Block 316 illustrates updating a second inventory associated with the second merchant based at least in part on the service provider attributes of the service provider. In at least one example, the merchant profile management module 238 may provide an indication to the inventory management module 236 that the service provider is associated with the second merchant and the inventory management module 236 may update a second inventory associated with the second merchant based at least in part on the one or more service provider attributes. For instance, the inventory management module 236 may add a service and/or an attribute associated with a service based on the one or more service provider attributes to the second inventory. Additionally and/or alternatively, the inventory management module 236 may map, or otherwise associate, an identifier of the service provider to existing service(s) and/or attribute(s) of service(s) in the second inventory based at least in part on the one or more service provider attributes.

In some examples, the inventory management module 236 may update the second inventory associated with the second merchant without receiving any input from the second merchant. In other examples, the inventory management module 236 may update the second inventory associated with the second merchant responsive to receiving an indication from the device 202B operated by the second merchant that the second merchant desires the second inventory to be updated. Additional details associated with updating inventory(s) based on service provider attributes are described below with respect to FIGS. 5 and 6.

Figure 4:
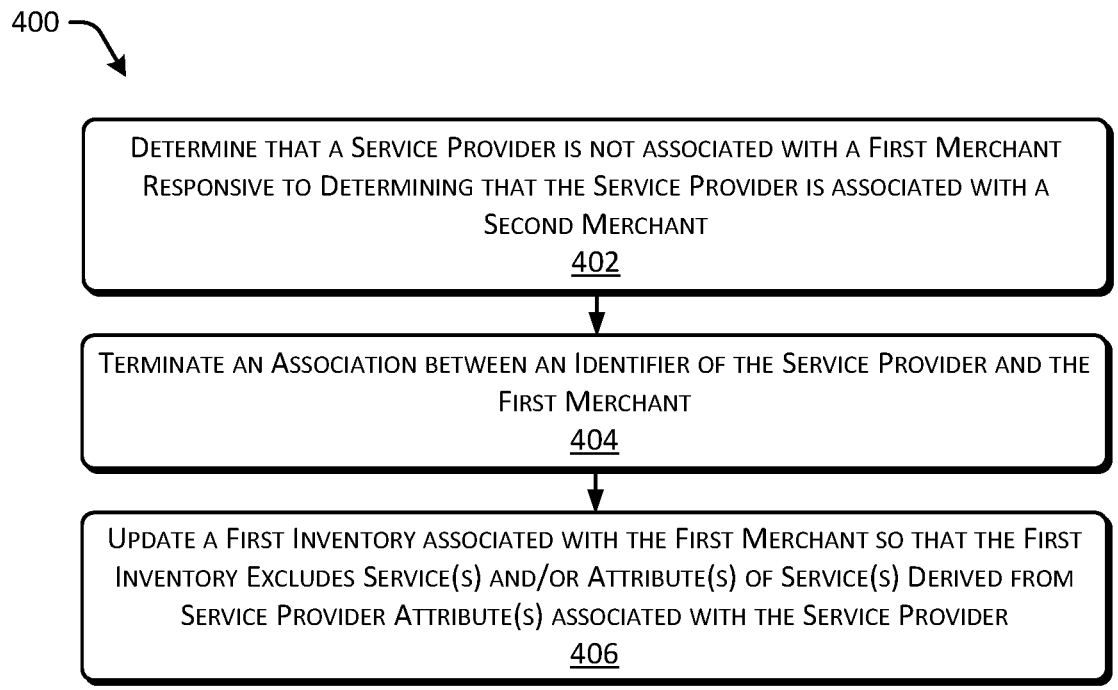
FIG. 4 depicts a non-limiting flow diagram illustrating a method for terminating an association between an identifier of a service provider and a merchant based on onboarding the service provider with another merchant in accordance with some examples of the present disclosure.

FIG. 4 depicts a non-limiting flow diagram illustrating a method 400 for terminating an association between an identifier of a service provider based on onboarding the service provider with another merchant. FIG. 4 is illustrated in the employee service-provider onboarding system 200 described above with reference to FIG. 2; however, FIG. 4 should not be limited to such an employee service-provider onboarding system.

Block 402 illustrates determining that a service provider is not associated with a first merchant responsive to determining that the service provider is associated with a second merchant. As described above with reference to FIG. 1, in at least one example, the merchant profile management module 238 may receive an indication that a service provider associated with a first merchant is associated with a second merchant. In some examples, an indication that a service provider is associated with the second merchant may include an indication that the service provider is no longer associated with the first merchant. That is, in such examples, an indication that a service provider is associated with the second merchant may expressly indicate that the service provider is no longer associated with the first merchant.

In additional and/or alternative examples, the merchant profile management module 238 may determine whether the service provider is associated with the second merchant instead of to the first merchant based at least in part on data received from the second merchant. For instance, if data received from the second merchant indicates that the service provider is employed full-time by the second merchant, the merchant profile management module 238 may infer that the service provider is no longer associated with the first merchant. Additionally and/or alternatively, the merchant profile management module 238 may access transaction data associated with transactions of the first merchant and transactions of the second merchant. Based at least in part on processing the transaction data, the merchant profile management module 238 may infer that the service provider is no longer associated with the first merchant. For instance, if the transaction data associated with transactions of the first merchant includes less than a threshold number of transactions involving the service provider and/or the transaction data associated with transactions of the second merchant includes more than a threshold number of transactions involving the service provider, the merchant profile management module 238 may infer that the service provider is no longer associated with the first merchant.

Block 404 illustrates terminating an association between an identifier of the service provider and the first merchant. Based at least in part on determining that the service provider is not associated with the first merchant, the merchant profile management module 238 may terminate an association between an identifier of the service provider and the first merchant. That is, in at least one example, the merchant profile management module 238 may un-map, or otherwise disassociate, the identifier that is unique to the service provider from a merchant profile corresponding to the first merchant in the merchant profile(s) 250. Additionally and/or alternatively, the service provider profile management module 240 may un-map, or otherwise disassociate, the identifier associated with the first merchant from the identifier that is unique to the service provider. That is, in additional and/or alternative examples, the service provider profile management module 240 may un-map, or otherwise disassociate, the identifier associated with the first merchant from a service provider profile corresponding to the service provider in the service provider profile(s) 252.

Block 406 illustrates updating a first inventory associated with the first merchant so that the first inventory excludes service(s) and/or attributes of service(s) derived from service provider attribute(s) associated with the service provider. In at least one example, the merchant profile management module 238 may provide an indication to the inventory management module 236 that the service provider is not associated with the first merchant, and the inventory management module 236 may update a first inventory associated with the first merchant such to remove service(s) and/or attribute(s) of service(s) that are based on the one or more service provider attributes. In at least one example, the inventory management module 236 may determine whether any other service provider is associated with service provider attributes that are associated with service(s) and/or attribute(s) derived from the one or more service provider attributes of the service provider. Based at least in part on determining that no other service providers are associated with service provider attributes that are associated with the service(s) and/or attribute(s), the inventory management module 236 may remove the service(s) and/or the attribute(s) from the first inventory. Additionally and/or alternatively, based at least in part on determining that another service provider is associated with service provider attributes that are associated with service(s) and/or attribute(s), the inventory management module 236 may un-map, or otherwise disassociate, the identifier of the service provider from the service(s) and/or attribute(s) of service(s) in the first inventory.

In at least one example, removing service(s) and/or attribute(s) may affect a rating or other merchant attribute of the first merchant. In such an example, the merchant profile management module 238 may update a rating or other merchant attribute of the first merchant based at least in part on the removal of the service(s) and/or attribute(s).

Figure 5:
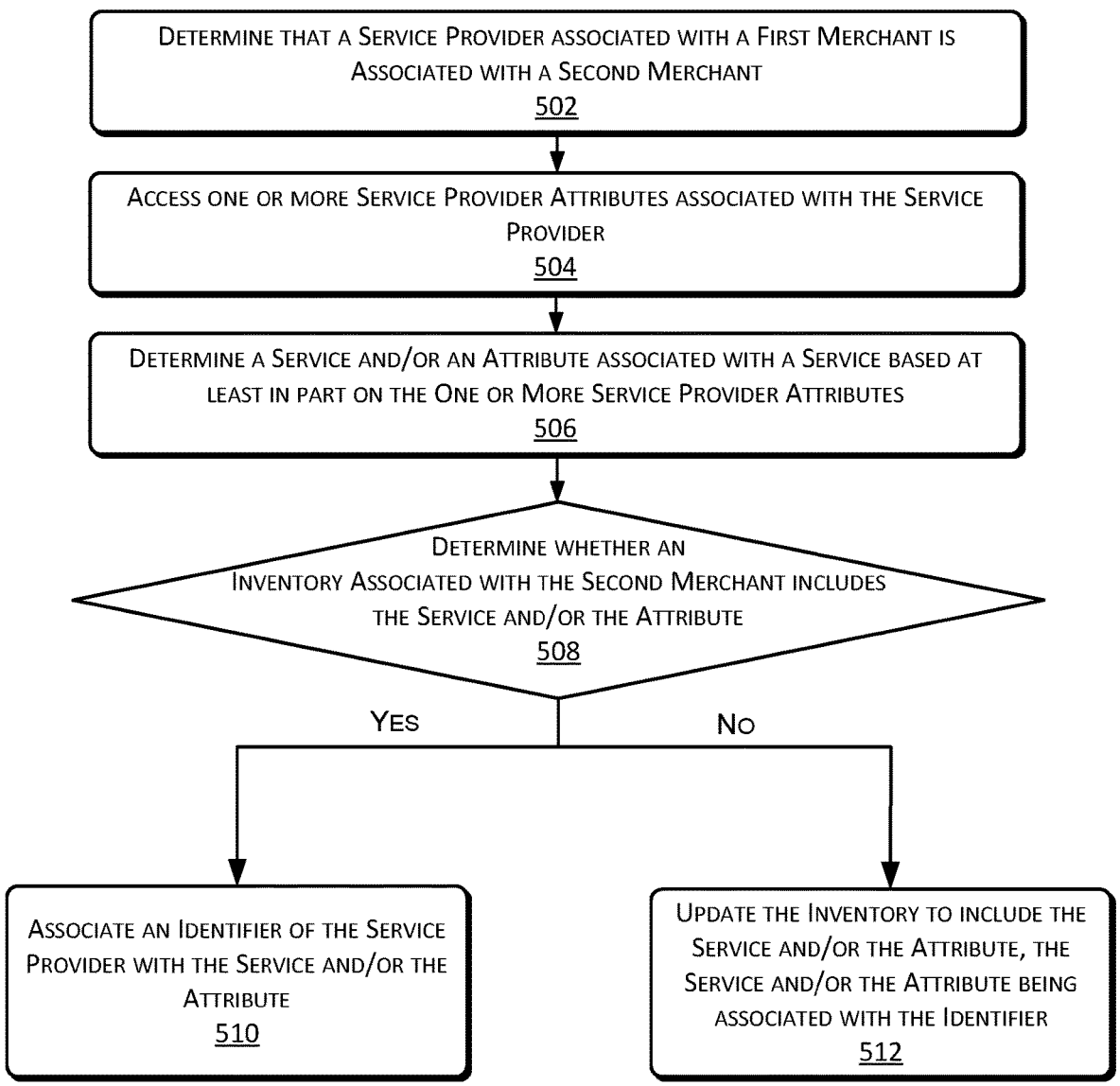
FIG. 5 depicts a non-limiting flow diagram illustrating a method for updating an inventory of a merchant based at least in part on service provider attributes associated with a service provider in accordance with some examples of the present disclosure.

FIG. 5 depicts a non-limiting flow diagram illustrating a method 500 for updating an inventory of a merchant based at least in part on service provider attributes associated with a service provider. FIG. 5 is illustrated in the employee service-provider onboarding system 200 described above with reference to FIG. 2; however, FIG. 5 should not be limited to such an employee service-provider onboarding system.

Block 502 illustrates determining that a service provider associated with a first merchant is associated with a second merchant. As described above with reference to FIG. 2, in at least one example, the merchant profile management module 238 may receive an indication that a service provider is associated with a second merchant. In some examples, the service provider may be associated with the second merchant instead of a first merchant. In other examples, the service provider may be associated with the second merchant in addition to the first merchant.

Block 504 illustrates accessing one or more service provider attributes associated with an identifier corresponding to the service provider. As described above, a service provider may be associated with a service provider profile in the service provider profile(s) 252. In at least one example, data associated with one or more service provider attributes may be mapped to, or otherwise associated with, the service provider profile corresponding to the service provider. In at least one example, the merchant profile management module 238 may provide an indication to the inventory management module 236 that the service provider is associated with the second merchant and the inventory management module 236 may access the data associated with the one or more service provider attributes that is mapped to, or otherwise associated with, the service provider profile.

In at least one example, the inventory management module 236 may access data associated with a merchant profile of the second merchant and may determine a merchant category code of the second merchant. In such an example, the inventory management module 236 may filter the one or more service provider attributes based at least in part on the merchant category code. That is, in at least one example, the inventory management module 236 may remove service provider attribute(s) that are not relevant to the merchant category code. For instance, if a service provider is associated with service provider attributes for salon services and spa services, and the second merchant is associated with a merchant category code that indicates that the second merchant offers salon services, the inventory management module 236 may remove service provider attribute(s) associated with spa services.

Block 506 illustrates determining a service and/or an attribute of a service based on the one or more service provider attributes. The inventory management module 236 may determine one or more services and/or one or more attributes of individual services based on the one or more service provider attributes. In at least one example, the inventory management module 236 may utilize a predetermined set of rules to determine service(s) and/or attribute(s) of service(s) based on one or more service provider attributes. In additional and/or alternative examples, the inventory management module 236 may utilize a machine learning mechanism, which may build, modify, or otherwise utilize a data model that is created from example inputs and makes predictions or decisions using the data model. In at least one example, a machine learning mechanism may be used to predict a service and/or attribute of a service based on one or more service provider attributes. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

Block 508 illustrates determining whether an inventory associated with the second merchant includes the service and/or the attribute. As described, individual merchants may be associated with individual inventories of the inventory(s) 248. In at least one example, the inventory management module 236 may access an inventory associated with the second merchant. The inventory management module 236 may determine whether the inventory includes the service and/or the attribute. Based at least in part on determining that the second inventory includes the service and/or the attribute, the inventory management module 236 may map, or otherwise associate, an identifier of the service provider to the service and/or the attribute in the inventory, as illustrated in block 510. Based at least in part on determining that the second inventory does not include the service and/or the attribute, the inventory management module 236 may add the service and/or the attribute to the inventory, as illustrated in block 512. In such examples, the inventory management module 236 may map, or otherwise associate, the identifier of the service provider to the service and/or the attribute. Furthermore, in such examples, the inventory management module 236 may determine that the service and/or the attribute is associated with an identification code in an inventory associated with the first merchant. Accordingly, the inventory management module 236 may map, or otherwise associate, the identification code to the service and/or the attribute in the inventory of the second merchant.

As described above, in some examples, the inventory management module 236 may update the inventory of the second merchant without receiving any input from the second merchant. Alternatively, in other examples, the inventory management module 236 may update the inventory of the second merchant based at least in part on input provided by the second merchant, as described below with reference to FIG. 6.

Figure 6:
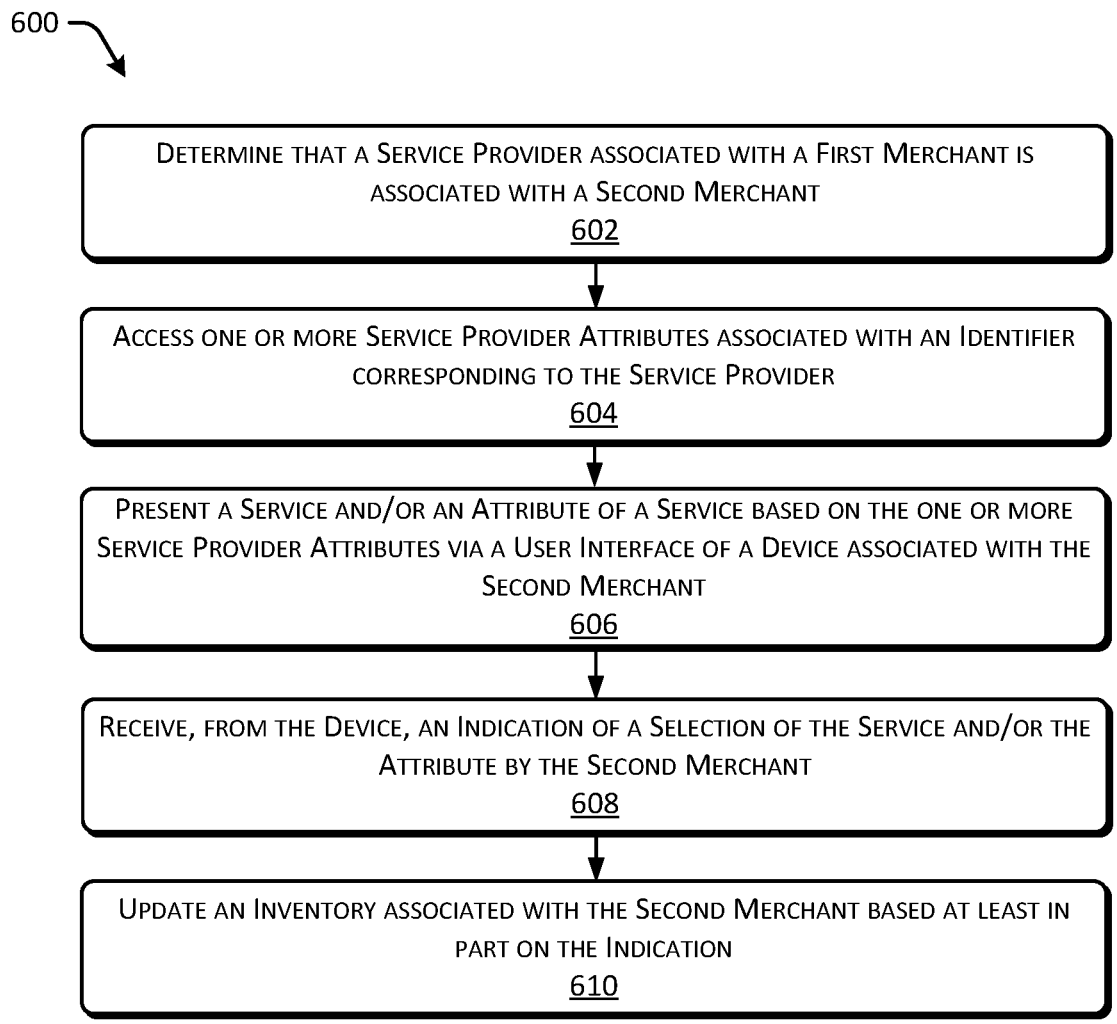
FIG. 6 depicts a non-limiting flow diagram illustrating a method for updating an inventory of a merchant based at least in part on receiving input via a user interface in accordance with some examples of the present disclosure.

FIG. 6 depicts a non-limiting flow diagram illustrating a method 600 for updating an inventory of a merchant based at least in part on receiving input via a user interface. FIG. 6 is illustrated in the employee service-provider onboarding system 200 described above with reference to FIG. 2; however, FIG. 6 should not be limited to such an employee service-provider onboarding system.

Block 602 illustrates determining that a service provider associated with a first merchant is associated with a second merchant. As described above with reference to FIG. 1, in at least one example, the merchant profile management module 238 may receive an indication that a service provider is associated with a second merchant. In some examples, the service provider may be associated with the second merchant instead of a first merchant. In other examples, the service provider may be associated with the second merchant in addition to the first merchant.

Block 604 illustrates accessing one or more service provider attributes associated with an identifier corresponding to the service provider. As described above, a service provider may be associated with a service provider profile in the service provider profile(s) 252. In at least one example, data associated with one or more service provider attributes may be mapped to, or otherwise associated with, the service provider profile corresponding to the service provider. In at least one example, the merchant profile management module 238 may provide an indication to the inventory management module 236 that the service provider is associated with the second merchant, and the inventory management module 236 may access the data associated with the one or more service provider attributes that is mapped to, or otherwise associated with, the service provider profile. The inventory management module 236 may determine one or more services and/or one or more attributes of individual services based on the one or more service provider attributes.

Block 606 illustrates presenting a service and/or an attribute of a service based on the one or more service provider attributes via a user interface of a device associated with the second merchant. In at least one example, the communication module 246 may send instructions to a device (e.g., device 202B) operated by the second merchant. The device 202B (e.g., a presentation module associated with the device 202B) may generate a user interface based on the instructions. The user interface may present a representation of a service and/or an attribute of a service based on the one or more service provider attributes.

Block 608 illustrates receiving, from the device, an indication of a selection of the service and/or the attribute by the second merchant. The second merchant may interact with the user interface to indicate whether he or she desires to add the service and/or the attribute to its inventory. In some examples, the user interface may be configured to enable the second merchant to name the service and/or the attribute and/or to provide additional data associated with the service and/or the attribute. For instance, the second merchant may assign a price, a discount, etc. with the service and/or the attribute. The device 202B may send an indication of the selection and any additional data input via the user interface to the inventory management module 236.

Block 610 illustrates updating an inventory associated with the second merchant based at least in part on the indication. Based at least in part on receiving the indication, the inventory management module 236 may update an inventory associated with the second merchant to include the service and/or the attribute and any additional data input via the user interface.

FIG. 7 depicts a non-limiting flow diagram illustrating a method 700 for searching for service provider(s) having particular service provider attributes in accordance with some examples of the present disclosure. FIG. 7 is illustrated in the employee service-provider onboarding system 200 described above with reference to FIG. 2; however, FIG. 7 should not be limited to such an employee service-provider onboarding system.

Block 702 illustrates receiving, from a device associated with a merchant, a request for information association with one or more service providers having a particular service provider attribute. In at least one example, the search module 244 may receive a query from a device (e.g., device 202A). The query may be a request for the identity of one or more service providers having particular service provider attribute(s). As a non-limiting example, a merchant (e.g., merchant 204A) corresponding to the device 202A may be interested in hiring a new employee for a particular purpose (e.g., with a particular certification, specialty service, etc.).

Block 704 illustrates accessing service provider profiles storing data associated with a plurality of service providers and one or more service provider attributes. As described above, the data store 212 may include service provider profile(s) 252 respectively corresponding to individual service providers. Each service provider profile may be associated with an identifier that is unique to the service provider to which the service provider profile corresponds. A service provider profile may include demographic data associated with a service provider, services offered by the service provider, service provider attributes associated with a service provider, an employment status associated with a service provider, etc. As described above, service provider attributes may identify certification(s) of a service provider, level(s) of expertise of a service provider (e.g., expert, novice, etc.), specialty services offered by a service provider (e.g., a particular type of massage, a particular type of haircut, etc.), feedback associated with a service provider, a rating associated with a service provider, etc. In at least one example, the search module 244 may access data in the data store 212 to determine one or more service providers having the particular service provider attribute(s).

Block 706 illustrates determining one or more service providers associated with the particular service provider attribute. In at least one example, the search module 244 may process the data in the data store 212 to determine one or more service providers associated with the particular service provider attribute. For instance, the search module 244 may locate the particular service provider attribute in the service provider profile(s) 252 and may determine one or more identifiers associated with the particular service provider attribute. As described above, each identifier may represent a particular service provider.

Block 708 illustrates sending, to the device, an indication identifying the one or more service providers. The search module 244 may provide a result back to the device (e.g., device 202A) based on the results of its search. That is, in at least one example, the search module 244 may leverage the one or more identifiers associated with the particular service provider attribute to determine service providers that are associated with the particular service provider attribute. The search module 244 may generate a result to return to the device 202A. The result may identify one or more service providers associated with the particular service provider attribute.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. An employee service-provider onboarding system provided by a payment processing service provider as a tool for merchants that subscribe to the payment processing service provider to onboard service-based employees, wherein the employee service-provider onboarding system comprises one or more server computing devices configured with instructions to:

maintain, by the one or more server computing devices of the employee service-provider onboarding system, one or more databases including:
a first merchant service inventory corresponding to services offered by a first merchant, the first merchant service inventory including data entries corresponding to attributes of the services of the first merchant;
a second merchant service inventory corresponding to services offered by a second merchant, the second merchant service inventory including data entries corresponding to attributes of the services of the second merchant; and
service-level data entries corresponding to a plurality of service offerings of at least the first merchant, wherein each service-level data entry corresponds to at least one identifier of at least one employee and at least one service provider attribute of the at least one employee;

receive, by the one or more server computing devices of the employee service-provider onboarding system and from a first merchant point-of-sale (POS) application executing on a first POS device operated by the first merchant, transaction data associated with one or more transactions conducted between one or more customers and an employee of the first merchant;

determine, by the one or more server computing devices of the employee service-provider onboarding system and based on the transaction data, one or more service provider attributes of the employee;

associate, by the one or more server computing devices of the employee service-provider onboarding system, the one or more service provider attributes with a data entry corresponding to an identifier of the employee in the service-level data entries;

receive, by the one or more server computing devices of the employee service-provider onboarding system and from a second merchant POS application executing on a second POS device operated by the second merchant, identification data associated with the employee;

determine, by the one or more server computing devices of the employee service-provider onboarding system and based on the identification data, the identifier of the employee;

identify, by the one or more server computing devices of the employee service-provider onboarding system and based on the service-level data entries and the identifier, the one or more service provider attributes associated with the employee; and modify, by the one or more server computing devices of the employee service-provider onboarding system and responsive to identifying the one or more service provider attributes of the employee, the second merchant service inventory, wherein at least one of a service or an attribute of the service is added to the second merchant service inventory without input from the second merchant.

2. The employee service-provider onboarding system of claim 1, the instructions further comprising:

causing a user interface to be presented via the second POS device, wherein the user interface prompts the second merchant to assign a price to the at least one of the service or the attribute of the service;

receiving an indication to associate the price with the at least one of the service or the attribute of the service to the second merchant service inventory; and modifying the at least one of the service or the attribute of the service in the second merchant service inventory based at least in part on the indication, wherein the modifying comprises associating the at least one of the service or the attribute of the service with the price.

3. The employee service-provider onboarding system of claim 1, wherein:

the service or the attribute of the service is associated with an identification code; and the instructions further comprise modifying the second merchant service inventory to include the identification code.

4. The employee service-provider onboarding system of claim 1, the instructions further comprising:

receiving, from a third POS device operated by a third merchant, a request for information associated with one or more employees having a service provider attribute;

determining, based at least in part on the service-level data entries, one or more identifiers associated with the service provider attribute; and sending, to the third POS device, a result identifying one or more employees corresponding to the one or more identifiers.

5. A computer-implemented method comprising:

receiving, by one or more server computing devices associated with a payment processing service, transaction data associated with one or more transactions between a first merchant and one or more customers, wherein the transaction data is received from a first point-of-sale (POS) application on a first POS device operated by the first merchant;

determining, by the one or more server computing devices and based at least in part on the transaction data, one or more service provider attributes of a service provider;

associating, by the one or more server computing devices and in a database maintained by the one or more server computing devices, the one or more service provider attributes with a data entry corresponding to an identifier of the service provider;

receiving, by the one or more server computing devices and from a second POS application on a second POS device operated by a second merchant, identification data associated with the service provider;

determining, by the one or more server computing devices and based on the identification data, the identifier of the service provider;

identifying, by the one or more server computing devices and based on the identifier, the one or more service provider attributes associated with the service provider;

determining by the one or more server computing devices, that a second merchant service inventory does not include the one or more service provider attributes associated with the service provider; and updating, by the one or more server computing devices and based at least in part on determining that the second merchant service inventory does not include the one or more service provider attributes, the second merchant service inventory without input from the second merchant, wherein the second merchant service inventory is displayed, via an interface of the second POS device, based on the one or more service provider attributes of the service provider.

6. The computer-implemented method of claim 5, wherein the one or more transactions are associated with the identifier.

7. The computer-implemented method of claim 5, wherein determining the one or more service provider attributes of the service provider is further based at least in part on:

accessing feedback data associated with the first merchant and the service provider; and determining the one or more service provider attributes based on the feedback data.

8. The computer-implemented method of claim 5, wherein the one or more service provider attributes include at least one of a certification, a level of expertise, a specialty, or a rating.

9. The computer-implemented method of claim 5, further comprising, causing, based at least in part on receiving the identification data, the interface of the second POS device to present a service or an attribute of the service based on the one or more service provider attributes.

10. The computer-implemented method of claim 9, further comprising:

determining a merchant classification associated with the second merchant;

determining a subset of service provider attributes of the one or more service provider attributes based at least in part on the merchant classification; and determining the service or the attribute of the service based at least in part on the subset of service provider attributes.

11. The computer-implemented method of claim 9, wherein, subsequent to updating the second merchant service inventory, the interface of the second POS device is configured to enable the second merchant to at least one of:

name the service or the attribute of the service; or assign a price to the service or the attribute of the service.

12. The computer-implemented method of claim 9, wherein:
- the service or the attribute of the service is associated with an identification code; and
- wherein updating the second merchant service inventory comprises adding the identification code to the second merchant service inventory.

13. The computer-implemented method of claim 5, further comprising, based at least in part on receiving the identification data associated with the service provider:
- terminating an association between the identifier and the first merchant; and
- associating the identifier with the second merchant.

14. The computer-implement method of claim 5, further comprising further determining that the service provider is associated with the second merchant based at least in part on receiving an indication from a device operated by the service provider that the service provider is associated with the second merchant.

15. One or more non-transitory computer-readable media executable by one or more processors to perform acts comprising:
- associating, in a database maintained by one or more server computing devices associated with a payment processing service, an identifier of a service provider associated with a first merchant of a plurality of merchants, wherein the identifier is associated with service provider data corresponding to the service provider;
- determining, by the one or more server computing devices, that the service provider is associated with a second merchant of the plurality of merchants; and
- updating, by the one or more server computing devices and based on determining the service provider is associated with the second merchant, a second merchant service inventory associated with the second merchant, wherein the updating comprises:
  - determining, by the one or more server computing devices and based on the service provider data, at least a service or an attribute of the service associated with the service provider;
  - determining, by the one or more server computing devices, that the second merchant does not offer the service or the attribute of the service associated with the service provider; and
  - updating, by the one or more server computing devices and responsive to determining that the second merchant does not offer the service or the attribute of the service associated with the service provider, the second merchant service inventory to include at least one of the service or the attribute of the service associated with the service provider without input from the second merchant.

16. One or more non-transitory computer-readable media as claim 15 recites, wherein the service provider data includes at least one of a certification associated with the service provider, one or more specialty services offered by the service provider, an experience level of the service provider, or feedback associated with the service provider.

17. One or more non-transitory computer-readable media as claim 15 recites, the acts further comprising determining that the service provider is associated with the second merchant based at least in part on receiving identification data associated with the service provider from a point-of-sale device operated by the second merchant.

18. One or more non-transitory computer-readable media as claim 15 recites, the acts further comprising determining that the service provider is associated with the second merchant based at least in part on receiving an indication from a device operated by the service provider that the service provider is associated with the second merchant.

19. One or more non-transitory computer-readable media as claim 15 recites, the acts further comprising:
- determining that the service provider is no longer associated with the first merchant;
- terminating an association between the identifier and the first merchant; and
- removing at least one of the service or the attribute of the service associated with the service provider from a first merchant service inventory associated with the first merchant.

20. One or more non-transitory computer-readable media as claim 15 recites, the acts further comprising updating, by the one or more service computing devices and responsive to updating the second merchant service inventory to include the at least one of the service or the attribute, a merchant attribute of the second merchant, wherein the merchant attribute of the second merchant includes at least one of a rating or a score.

* * * * *